United States Patent
Jensen et al.

(10) Patent No.: US 11,861,037 B2
(45) Date of Patent: Jan. 2, 2024

(54) UNIFIED DATA FABRIC FOR MANAGING DATA LIFECYCLES AND DATA FLOWS

(71) Applicant: Aetna Inc., Hartford, CT (US)

(72) Inventors: Claus T. Jensen, Pawling, NY (US); John A. Pierce, Jr., Manchester, CT (US); Igor B. Bord, Richboro, PA (US); Dale J. Ianni, Coventry, CT (US)

(73) Assignee: Aetna Inc., Hartford, CT (US)

( * ) Notice: Subject to any disclaimer, the term of this patent is extended or adjusted under 35 U.S.C. 154(b) by 422 days.

(21) Appl. No.: 16/673,692

(22) Filed: Nov. 4, 2019

(65) Prior Publication Data

US 2021/0133349 A1 May 6, 2021

(51) Int. Cl.
*G06F 21/62* (2013.01)
*G06F 16/25* (2019.01)
*G06F 21/57* (2013.01)
*G06F 16/215* (2019.01)

(52) U.S. Cl.
CPC ........ *G06F 21/6245* (2013.01); *G06F 16/215* (2019.01); *G06F 16/252* (2019.01); *G06F 21/57* (2013.01); *G06F 21/6227* (2013.01); *G06F 2221/2141* (2013.01)

(58) Field of Classification Search
CPC .. G06F 21/6245; G06F 16/215; G06F 16/252; G06F 21/57; G06F 21/6227; G06F 2221/2141
See application file for complete search history.

(56) References Cited

U.S. PATENT DOCUMENTS

| | | | |
|---|---|---|---|
| 10,635,837 B1 * | 4/2020 | Jun ..................... | G06F 21/6263 |
| 2006/0143149 A1 * | 6/2006 | Li .......................... | G06F 21/62 |
| 2006/0179026 A1 * | 8/2006 | Bechtel .................. | G16H 70/00 |
| | | | 706/45 |
| 2016/0210427 A1 * | 7/2016 | Mynhier ................ | G16H 50/20 |
| 2016/0342812 A1 * | 11/2016 | Lynch ................... | H04W 12/02 |
| 2020/0004938 A1 * | 1/2020 | Brannon ............... | G06F 21/316 |
| 2020/0110894 A1 * | 4/2020 | Binkley ............... | G06F 21/6245 |
| 2020/0327250 A1 * | 10/2020 | Wang .................... | G06F 21/602 |
| 2021/0043319 A1 * | 2/2021 | Lequeux ............... | G16H 40/67 |

OTHER PUBLICATIONS

Jensen, Claus T. "The Hybrid Cloud Journey," *The Hybrid Cloud Journey for Dummies, CVS Health Special Edition*, published by John Wiley & Sons, Inc. (May 7, 2019).

* cited by examiner

*Primary Examiner* — Theodore C Parsons
*Assistant Examiner* — Alan L Kong
(74) *Attorney, Agent, or Firm* — Leydig, Voit & Mayer, Ltd.

(57) ABSTRACT

A unified data fabric for controlling data lifecycles and data flows between trusted data sources and data clients is described herein. A system can include a data ingestion engine and a data delivery engine. The data ingestion engine and the data delivery engine are connected to a data lifecycle engine that maintains data control policies and access control policies. The data ingestion engine is configured to control ingestion of data elements into the unified data fabric based on the data control policies, and the data delivery engine is configured to control access to data elements in the unified data fabric based on access control policies. Each data element from one or more trusted data sources is associated with a global identifier to provide a comprehensive view of information about a constituent from a variety of disparate data sources.

11 Claims, 11 Drawing Sheets

UNIFIED DATA FABRIC FOR MANAGING DATA LIFECYCLES AND DATA FLOWS

BACKGROUND

Data is widely available via the Internet or other sources. Entire platforms have been developed to leverage data in a way that is useful for consumers or valuable for business entities. Social media is a multi-billion dollar business that is built upon the concept of leveraging data on individuals for purposes of advertising or analytics.

However, there are many aspects of data collection that are of concern to consumers or regulators. For example, consumers have privacy concerns related to the collection of data on the Internet or through other means. In addition, much of the data that could be collected from various sources may be regulated by government laws or regulations, such as the Health Insurance Portability and Accountability Act (HIPAA) in the United States or various data privacy laws in Europe, that could subject businesses that collect or utilize that data to civil or criminal penalties.

For organizations that rely on this data for one or more aspects of their business, another concern is in the reliability of the data. There is a lack of adequate safeguards in place to ensure that data collected is accurate and reliable. Where data is as likely to be inaccurate as accurate, the value of the data is severely diminished.

Finally, it can be difficult utilizing conventional platforms to combine data from disparate sources to provide a comprehensive view of data related to individuals. It can be hard to match data from one data source to data from another data source and correlate the data as belonging to or being associated with a particular individual.

SUMMARY

A unified data fabric for controlling data lifecycles and data flows between trusted data sources and data clients is described herein. A system can include a data ingestion engine and a data delivery engine. The data ingestion engine and the data delivery engine are connected to a data lifecycle engine that maintains data control policies and access control policies. The data ingestion engine is configured to control the data protection policies of data elements into the unified data fabric based on the data control policies, and the data delivery engine is configured to control access to data elements in the unified data fabric based on access control policies. Each data element from one or more trusted data sources is associated with a global identifier to provide a comprehensive view of information about a constituent from a variety of disparate data sources.

In an embodiment, a system that manages data lifecycles and data flows between trusted data sources and data clients is disclosed. The system includes a data ingestion engine, a data lifecycle engine, and a data delivery engine. The data ingestion engine is configured to ingest data elements received from one or more trusted data sources. Each data element is associated with a global identifier allocated to a constituent associated with the information included in the data element. The data lifecycle engine is configured to manage access control policies for the data elements and map global identifiers to one or more source identifiers. The data delivery engine is configured to control access to the data elements based on the access control policies. In an embodiment, the constituent is one of an individual associated with demographic information, or an entity associated with a group of one or more individuals.

In an embodiment, the data ingestion engine is configured to receive a notification that a particular data source published a first data element. The data ingestion engine is further configured to identify an ingestion interface corresponding to the particular data source, identify zero or more data control policies associated with the particular data source, and determine that the data element is approved to be integrated with other data elements within the unified data fabric platform based on the zero or more data control policies. The data ingestion engine is further configured to retrieve the first data element from the particular data source via the ingestion interface and store the first data element in a data store.

In an embodiment, the data ingestion engine is further configured to process the first data element via conformance logic in accordance with one or more conformance rules for the particular data source, process the first data element via integration logic in accordance with permissions associated with the first data element, and record validation data that indicates whether the first data element was successfully ingested into the unified data fabric.

In an embodiment, the conformance logic includes instructions that cause a processor to compare a particular source identifier to a table of source identifiers to identify a corresponding global identifier mapped to the particular source identifier and associate the corresponding global identifier with the first data element.

In an embodiment, the data lifecycle engine is configured to manage data control policies and access control policies associated with data lifecycles. At least one data control policy is configured to specify a data type permitted from a particular trusted data source, and at least one access control policy is configured to specify a constituent type permitted to view a data type via a client.

In an embodiment, the data delivery engine is configured to receive a request from a client to access a first data element in a data store, determine whether the client is authorized to establish a connection with the data delivery engine, and determine whether the client is permitted to access the first data element based on a set of access control policies associated with the first data element. If the client is not authorized or not permitted to access the first data element, then the first data element is not presented to the client. However, if the client is authorized to establish the connection and permitted to access the first data element, then the data delivery engine is configured to transmit the first data element to the client.

In an embodiment, the set of access control policies includes at least one of a privacy policy, a compliance policy, a permissions policy, or a group policy.

In an embodiment, the data ingestion engine is configured to secure the data elements (e.g., through encryption) and store the secured data elements in one or more data stores.

In an embodiment, the data ingestion engine is configured to receive a first data element including a first source identifier from a first trusted data source and receive a second data element including a second source identifier from a second trusted data source. The data ingestion engine is further configured to determine that the first source identifier and the second source identifier are mapped to a particular global identifier for a single constituent and generate an integrated data element that includes first information from the first data element and second information from the second data element. The integrated data element is associated with the particular global identifier and stored in a data store.

In an embodiment, the data delivery engine is configured to receive a first data element from a first data store and receive a second data element from the first data store or a second data store. The first data element and the second data element are associated with a first global identifier. The data delivery engine is further configured to generate an integrated view of multiple data elements that includes first information from the first data element and second information from the second data element and transmit the integrated view to a client.

In an embodiment, a method for managing data lifecycles and data flows between trusted data sources and data clients is disclosed. The method includes receiving one or more data elements from one or more trusted data sources, for each data element in the one or more data elements, associating the data element with a global identifier allocated to a constituent associated with the information included in the data element, storing the one or more data elements in one or more data stores, and controlling access to the one or more data elements based on access control policies.

In an embodiment, the method further includes receiving a request from a client to access a first data element in a data store, determining whether the client is authorized to establish a connection with the data delivery engine, and determining whether the client is permitted to access the first data element based on a set of access control policies associated with the first data element. If the client is not authorized to establish the connection or not permitted to access the first data element, then the data element will not be presented to the client. However, if the client is authorized to establish the connection and permitted to access the first data element, then the method includes transmitting the first data element to the client.

In an embodiment, a non-transitory computer-readable medium is disclosed that stores instructions that, when executed by a processor, cause the processor to ingest data elements into a unified data fabric platform by performing the method set forth above.

DETAILED DESCRIPTION

Figure 1:
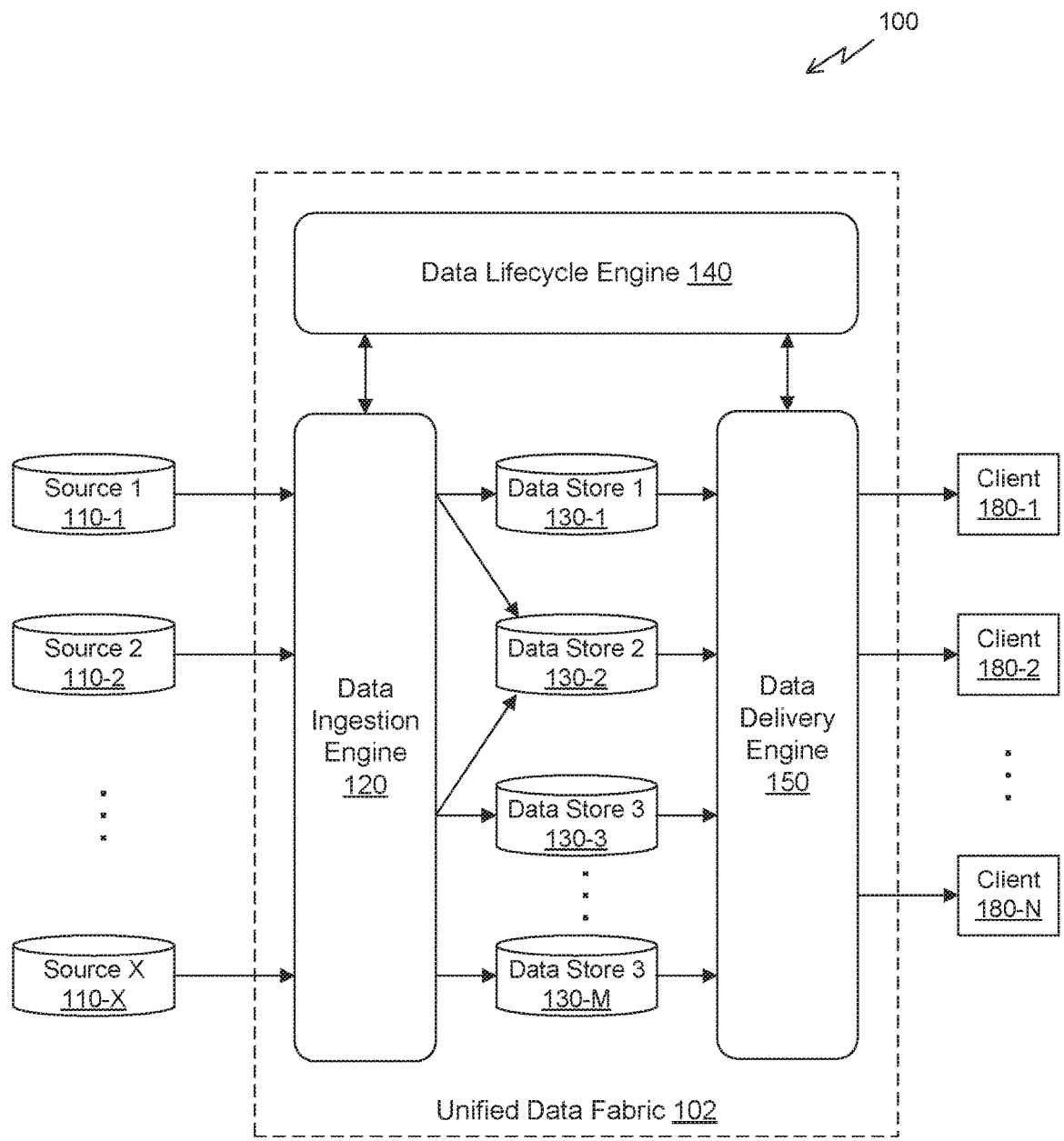
FIG. 1 illustrates a system for managing data lifecycles and data flows between trusted data sources and data clients, in accordance with some embodiments.

One goal of the unified data fabric is to protect and govern data associated with individuals to address privacy concerns, regulatory compliance, and ethical considerations. The basic functionality of the unified data fabric is to provide a standard repository for collecting data from a variety of trusted sources and to limit the use of collected data in accordance with various policies and preferences. The unified data fabric also correlates data from different sources to individuals related to the data through different relationships to provide a comprehensive view of information for a particular individual from the various trusted sources.

There is a need to provide consumers with as much relevant information as possible to help them complete various tasks. Organizations may collect data from a variety of different sources, both internal sources and external sources. For example, a single corporation may be associated with a number of different brands or businesses under a large corporate umbrella. A healthcare corporation may own one or more health insurance brands, a pharmacy brand, and be associated with a wide array of healthcare providers, which may not be owned under the umbrella corporation. The corporation may receive data related to health care claims, insurance premium payments, prescription information, and medical records from the healthcare providers. The corporation may also partner with various external companies like fitness centers, grocery stores, or the like to enact incentive programs to encourage a healthy lifestyle for their customers. The corporation may also receive information about potential customers through various marketing programs or consumer outreach through various employers. All of the data that is collected through these various avenues is typically collected and compartmentalized within the immediate program that collects the data for the specific intended use of that data. However, much of that data can be beneficial to a customer to provide the customer with a holistic view of their interaction with the corporation's various business units and/or partners. For example, a customer that is viewing a medical record related to high cholesterol may be interested in incentive programs for healthy eating in their local market that would help them lower their cholesterol, including information on whether they are already enrolled in the program or eligible for the program. By presenting that information in a user interface where the medical record is displayed in a manner that makes it easier for the customer to take advantage of those programs, both the customer and the business can enjoy the benefits of improving the customer's health.

However, it will be appreciated that, for example, it is typically difficult for a business to connect a customer that has a relationship with one business unit with that customer's relationship in another business unit or a program that is not even managed by the business. Sometimes, privacy or regulatory concerns require that such data should not be shared openly from one business unit to another. Ethical practices may encourage a business unit to ask a customer to opt-in or opt-out before data is shared between business units, and each business unit or affiliate may need to consider different concerns related to the sharing of information internally or externally.

Of course, while the example above is provided as related to a healthcare context, the embodiments of the system are not limited to such a context. The management of data lifecycles and data flows within an organization is widely applicable to many types of businesses or applications.

The unified data fabric described herein helps to address many of the concerns described above. Collection of data can be limited to trusted sources that helps to ensure the collected data is accurate and reliable. The use of data control policies and access control policies automatically applies a regulatory and compliance framework to the data elements in the unified data fabric, and these policies can also help address each individual's privacy concerns by letting the consumer constituents control how their information is disseminated through preferences or permissions. The unified data fabric can also help address data protection concerns, through securing of data at a data element level within secure data stores and by limiting the access to data from certain client devices.

FIG. 1 illustrates a system 100 for managing data lifecycles and data flows between trusted data sources and data clients, in accordance with some embodiments. As depicted in FIG. 1, the system 100 includes a unified data fabric 102 that receives data elements from one or more data sources 110 and controls access to the data by one or more clients 180. The unified data fabric 102 includes a data ingestion engine 120, a data lifecycle engine 140, and a data delivery engine 150. The unified data fabric 102 can also include a number of data stores 130 for storing data elements within the unified data fabric 102.

In some embodiments, the data ingestion engine 120 is configured to ingest data elements received from one or more trusted data sources. In an embodiment, the trusted data sources are defined sources for particular items of data. For example, a manager of the unified data fabric 102 can specify a particular network asset (e.g., a database, application, etc.) as the trusted source for address data for individuals. The manager can select the network asset over other network assets based on, e.g., an audit of the various assets and the accuracy of the information contained therein, security protocols associated with the network asset, breadth of records maintained by the asset, or the like. Reasons for selecting a particular asset as a trusted data source can vary, but the general indication when designating a data source as a trusted data source is that there is some assurance that the information included in the data source is reliable and accurate and that the selected data source is the best source of data for that type of information. In some embodiments, the trusted data sources can be included in a whitelist, where the data ingestion engine 120 is restricted to only allow ingestion of data elements from data sources included in the whitelist.

In some embodiment, a trusted data source is defined as a source that is determined to be the governing data authority for a specific piece of information that publishes the data through a managed interface and is charged with the responsibility for the accuracy of the data. The trusted data source can be a validated source of truth on behalf of a particular source of record, and can manage changes to the data over time.

In an embodiment, the data ingestion engine 120 associates each ingested data element with a global identifier allocated to a constituent associated with the information included in the data element. A constituent can include an individual associated with demographic information or an entity associated with a group of one or more individuals. For example, a constituent can be a customer of a business, associated with demographic information such as a name, an address, a date of birth, an identifier (e.g., social security number, driver's license number, customer identifier, etc.), or the like. As another example, a constituent can be a partnership or a business having a number of partners or employees.

Each unique constituent can be assigned a global identifier that uniquely identifies that constituent within the context of the unified data fabric 102. The data ingestion engine 120 is configured to identify the global identifier associated with each data element received from a trusted data source and, subsequently, associate the data element with the global identifier. In an embodiment, the data ingestion engine 120 appends the global identifier to the data element.

The data ingestion engine 120 can utilize ingestion interfaces configured for each trusted data source to ingest data elements into the unified data fabric 102. Data elements are then stored in one or more data stores 130. In some embodiments, each trusted data source corresponds to one or more data stores 130. At least one data store 130 can be created for each trusted data source. Some additional data stores 130 can also be created to store data elements that integrate information from two or more trusted data sources, which can be referred to herein as integrated data elements. For example, data store 1 130-1 corresponds to source 1 110-1, data store 3 130-3 corresponds to source 2 110-2, and data store 2 130-2 corresponds to source 1 110-1 and source 2 110-2. As shown in FIG. 1, the unified data fabric 102 includes M data stores (130-1, 130-2, . . . 130-M) and X data sources (110-1, 110-2, . . . 110-X).

As depicted in FIG. 1, in some embodiments, at least one data store, such as data store 130-2, can be configured to store an integrated data element that includes information received from different trusted data sources. The data ingestion engine 120 can be configured to receive a first data element including a first source identifier from a first trusted data source, and receive a second data element including a second source identifier from a second trusted data source. The data ingestion engine 120 determines that the first source identifier and the second source identifier are mapped to a particular global identifier for a single constituent and generates an integrated data element that includes first information from the first data element and second information from the second data element. The integrated data element is associated with the particular global identifier and stored in a data store 130.

In some embodiments, the data ingestion engine 120 is configured to secure data elements and store the secured data elements in the one or more data stores 130. A key of the secured data can be shared by the data ingestion engine 120 and the data delivery engine 150 such that the data delivery engine 150 can unlock the secured data elements prior to transmission to the client devices 180. In some embodiments, the data elements can be re-secured by the data delivery engine 150 prior to transmission to the client devices 180, using any technically feasible data security technique.

In some embodiments, the data lifecycle engine 140 is configured to manage data control policies and access control policies for the data elements. Data control policies are policies for controlling the ingestion of information in the data elements. Access control policies are policies for controlling the dissemination of information of data elements in the unified data fabric 102. Data control policies can specify what types of information can be ingested into the unified data fabric and access control policies can specify what information certain clients have permission to access.

Access control policies can include, but are not limited to, privacy policies, compliance policies, permissions policies, and group policies, as will be discussed in more depth below.

In an embodiment, the data ingestion engine 120 queries the data lifecycle engine 140 for any data control policies related to a particular data source 110 or a particular global identifier associated with the information in a data element. The data control policy specifies whether the information is permitted to be ingested into the unified data fabric 102. The data delivery engine 150 queries the data lifecycle engine 140 for any access control policies related to a particular data client 180 or a particular global identifier associated with the information in a data element. The access control policy specifies whether the information in the data element is permitted to be accessed by a particular data client 180. It will be appreciated that data control policies and access control policies can be related to a constituent (e.g., an individual) and enable that constituent to prevent certain information from being ingested into the unified data fabric 102, via a data control policy, or being utilized by certain clients 180, via an access control policy. However, data control policies and access control policies are not limited to preferences or permissions configured by a particular individual associated with the information, but can also incorporate legal and regulatory requirements, global privacy concerns, or preferences and permissions related to groups of individuals or groups of clients.

In some embodiments, the data delivery engine 150 is configured to control access to the data elements based on the access control policies. The data delivery engine 150 receives requests from clients 180 to access information in the unified data fabric 102. The request can include a read request that specifies a particular data element in the unified data fabric 102. The data delivery engine 150 can determine whether one or more access control policies permit the client 180 to access the data and, if the client has the appropriate permissions based on the access control policies, then the data delivery engine 150 returns the data element to the client 180 in a data access response.

In other embodiments, the request can specify a view of information included in one or more data elements. For example, the request can include a read request for information related to a particular global identifier, where the information can be included in one data element or from multiple data elements from one or more data sources. The data delivery engine 150 can compile the information from multiple data elements into a data access response and return a view of the information in the response. A view, as used herein, can refer to a particular structure or format that includes the relevant information, such as an extensible markup language (XML) document or JavaScript Object Notation (JSON) format document that includes elements that exposes various information from the one or more data elements.

Figure 2:
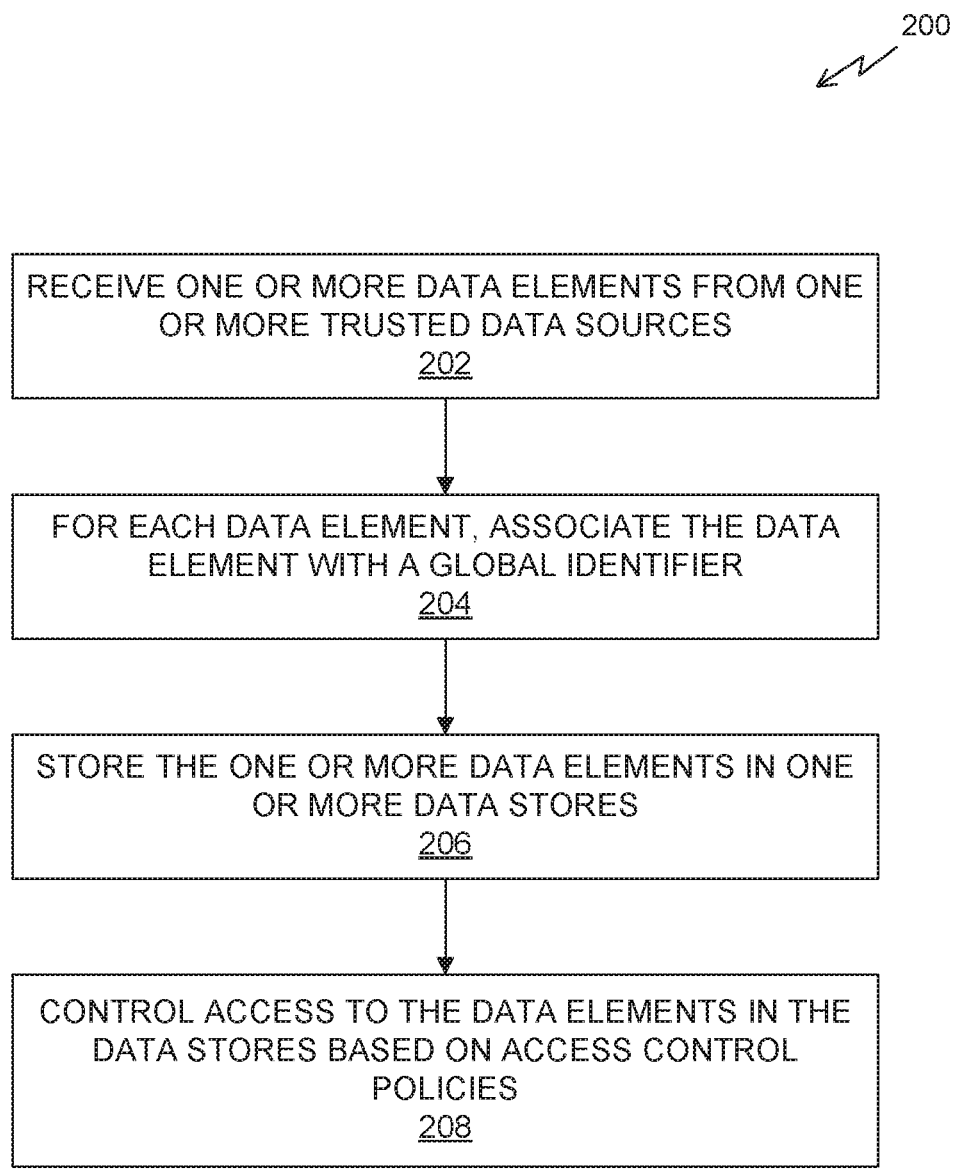
FIG. 2 is a flow diagram of a method for managing data lifecycles and data flows between trusted data sources and data clients, in accordance with some embodiments.

FIG. 2 is a flow diagram of a method 200 for managing data lifecycles and data flows between trusted data sources and data clients, in accordance with some embodiments. The method 200 can be performed by a program, custom circuitry, or by a combination of custom circuitry and a program. For example, the method 200 can be performed by one or more processors configured to execute instructions that cause the processor(s) to carry out the steps of the method 200. Furthermore, persons of ordinary skill in the art will understand that any system that performs method 200 is within the scope and spirit of the embodiments described herein.

At step 202, a data ingestion engine 120 receives one or more data elements from one or more trusted data sources. In an embodiment, the data ingestion engine 120 receives the one or more data elements via ingestion interfaces corresponding to the trusted data sources. In other embodiments, the ingestion interfaces are included in the data ingestion engine 120.

At step 204, for each data element, the data ingestion engine 120 associates the data element with a global identifier. In an embodiment, the data ingestion engine 120 reads a source identifier from the data element and queries a table to retrieve a global identifier corresponding to the source identifier. In some embodiments, the global identifier replaces the source identifier in the data element. In some embodiments, the table is included in a global identity and permissions database, application, or service that is external to the unified data fabric 102.

At step 206, the data ingestion engine 120 stores the one or more data elements in one or more data stores 130. In an embodiment, each trusted data source 110 can be associated with one or more data stores 130, and data elements ingested from a particular trusted data source 110 are stored in a corresponding data store 130. In other embodiments, each data store 130 is configured to be a repository for certain types of information, which can be received from any number of trusted data sources 110.

At step 208, the data delivery engine 150 controls access to the data elements in the data stores 130 based on a set of access control policies. In an embodiment, the data delivery engine 150 applies access control policies to permit or deny access to the data elements by client devices.

Figure 3A:
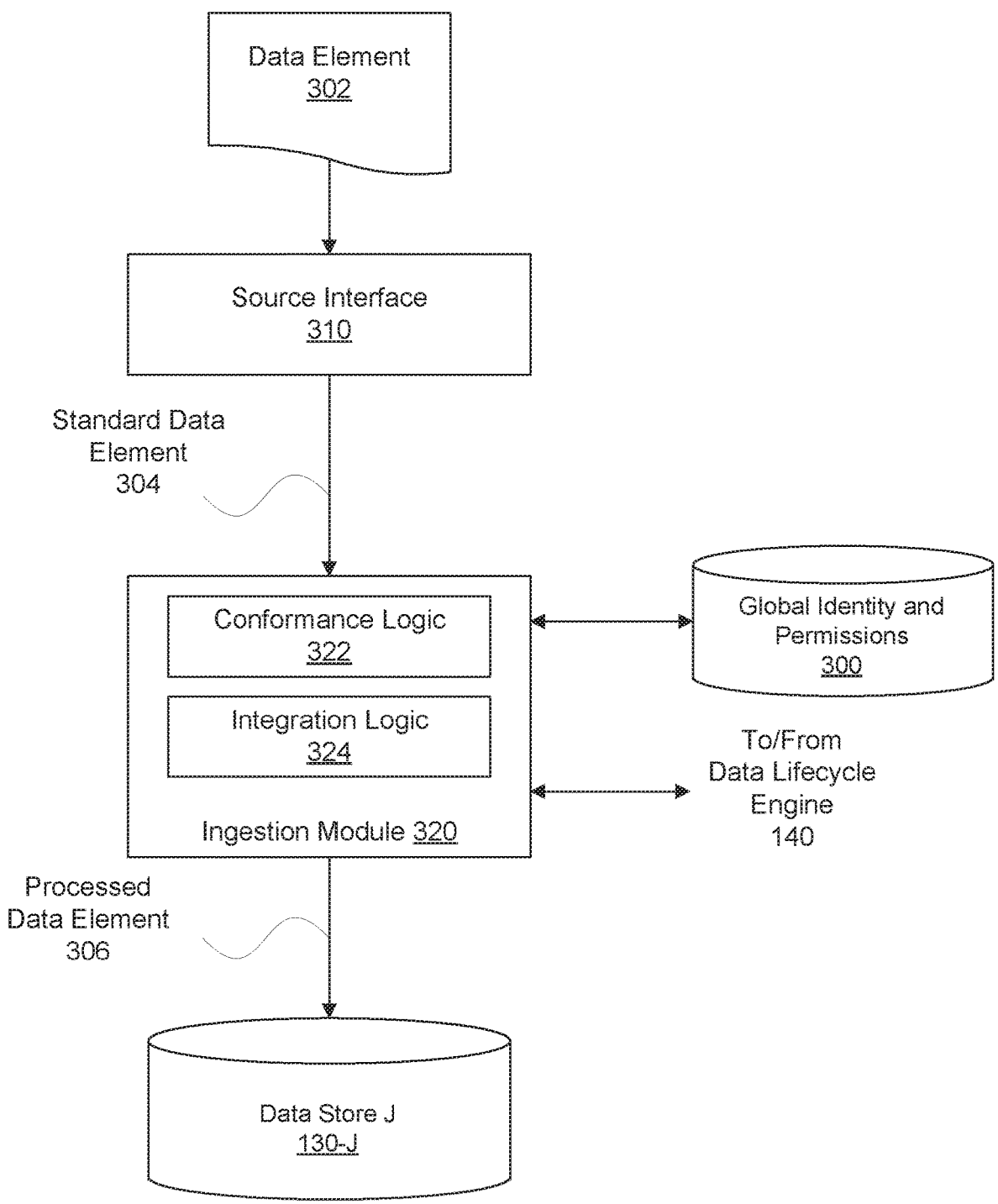
FIG. 3A illustrates a data flow for ingesting data elements into the unified data fabric, in accordance with some embodiments.

FIG. 3A illustrates a data flow for ingesting data elements 302 into the unified data fabric 102, in accordance with some embodiments. As depicted in FIG. 3A, a data element 302 is published by a trusted data source. As used herein, publishing a data element 302 can be defined as any technique that renders the data element available to the data ingestion engine 120. For example, a data element can be added to a database, either local or distributed, that is accessible to the data ingestion engine 120. As another example, the data element can be published in a resource available over a network (e.g., through a cloud-based service or through a document accessible over the Internet).

In some embodiments, the data ingestion engine 120 is configured to poll the data sources 110 periodically to identify whether any data elements have been published. For example, the data ingestion engine 120 can transmit a request to each data source 110 periodically (e.g., hourly, daily, weekly, etc.) for a record that includes a list of identifiers for new data elements published in a time period since the last request. In other embodiments, the data ingestion engine 120 is configured to receive a notification of published data elements. For example, each data source 110 can be configured to transmit a notice that new data element(s) have been published whenever a new data element is published by the data source 110.

As described above, each data source 110 can be associated with one or more ingestion interfaces. Each ingestion interface is configured to parse one or more items of information from the data element 302 based on, e.g., an expected format of the data element 302, a particular characteristic of the information (e.g., a known key or tag associated with a particular field in the data element 302), or the like. The data ingestion engine 120 can be configured to select a particular ingestion interface from one or more ingestion interfaces associated with the data source 110 as the source interface 310, which is used to ingest the data element 302 into the unified data fabric 102. The source interface 310 can be implemented as a program or set of instructions that define how the data element 302 is processed.

The source interface 310 generates a standard data element 304 based on the data element 302 and logic included in the source interface 310. In an embodiment, the logic can include logic for parsing information in the data element to select a subset of information from the data element. In some embodiments, the logic can also include functions that generate new information based on the information in the data element 302. For example, the logic can include a function that converts a date of birth for an individual included in the data element 302 into an age of the individual in the standard data element 304, even though the age of the individual was not included explicitly in the data element 302. The logic can also format the information to match an expected format for the information in the standard data element 304. In some embodiments, the logic can also include logic that checks to make sure the information is consistent with a type of information expected. For example, if the source interface 310 expects to parse a date of birth for an individual, the logic can check that the retrieved date is for a year between Jan. 1, 1900 and the current date to ensure that the information is represents a likely date of birth for a living individual. Any dates outside of this range, or beyond the current date, for example, could be rejected as invalid information.

The standard data element 304 is then processed by an ingestion module 320. As used herein, the ingestion module 320 can include hardware or software, executed by one or more processors, that includes logic for processing the standard data element 304. In some embodiments, the ingestion engine 320 includes conformance logic 322 and integration logic 324. The conformance logic 322 is configured to match a source identifier provided by the data source 110 with a corresponding global identifier associated with the source identifier in the context of the unified data fabric 102. It will be appreciated that a constituent (e.g., an individual) allocated a particular global identifier can be associated with different source identifiers in different data sources 110. Consequently, one aspect of the conformance logic 322 is to match any source identifier included in the standard data element 304 to a global identifier. In an embodiment, the conformance logic 322 queries the global identity and permission database 300 based on the source identifier to return a corresponding global identifier. The conformance logic 322 can then replace the source identifier in the standard data element 304 with the global identifier. Alternatively, the global identifier can be appended to the standard data element 304 such that both the global identifier and the source identifier are included in the standard data element 304.

The standard data element 304 is also processed by integration logic 324. In some embodiments, the integration logic 324 requests one or more data control policies associated with the standard data element 304 from the data lifecycle engine 140. The request can include an identifier for the data source 110, a global identifier for the constituent associated with the information in the standard data element 304, or any other relevant information for determining whether the standard data element 304 is associated with any data control policies. The integration logic 324 can receive the one or more data control policies returned from the data lifecycle engine 140 and apply the data control policies, if any, to the standard data element 304.

For example, a data control policy can specify whether certain types of information from a particular data source 110 are permitted to be ingested into the unified data fabric 102. Since the data source 110 is the owner of the information, the data source 110 may permit specific uses for certain information and may restrict uses of other information. A data control policy can be defined for a specific data source 110 that indicates which information can be ingested from that data source 110. The integration logic 324 can read the data control policy and update the standard data element 304 based on the data control policy. For example, the integration logic 324 can remove certain information from the standard data element 304 entirely or modify other information (e.g., changing a social security number to only include the last four digits of a social security number).

It will be appreciated that a data control policy can be defined for more than one data source 110 (e.g., the policy can apply to all data sources or a subset of data sources controlled by a particular organization). A data control policy can also apply to a specific type of information (e.g., financial information such as account numbers can be prohibited from being ingested to prevent instances of fraud or identity theft).

Once the standard data element 304 is processed by the conformance logic 322 and the integration logic 324, the standard data element 304 can be stored as a processed data element 306 in one or more of the data stores 130, such as data store 1304, where J is less than M.

Figure 3B:
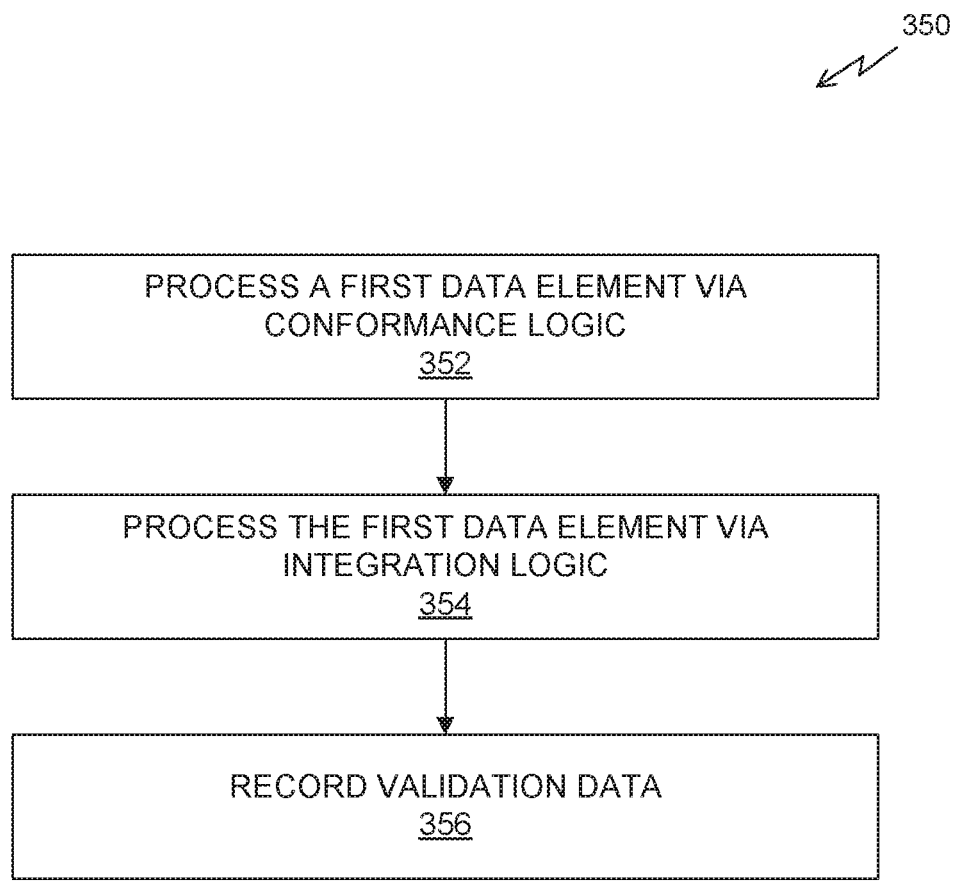
FIG. 3B is a flow diagram of a method for ingesting a data element into the unified data fabric, in accordance with some embodiments.

FIG. 3B is a flow diagram of a method 350 for ingesting a data element 302 into the unified data fabric 102, in accordance with some embodiments. The method 350 can be performed by a program, custom circuitry, or by a combination of custom circuitry and a program. For example, the method 350 can be performed by one or more processors configured to execute instructions that cause the processor(s) to carry out the steps of the method 350. Furthermore, persons of ordinary skill in the art will understand that any system that performs method 350 is within the scope and spirit of the embodiments described herein.

At step 352, a data element is processed by conformance logic 322. In an embodiment, the conformance logic 322 associates a standard data element 304 produced by a source interface 310 with a global identifier. In an embodiment, the conformance logic 322 includes instructions that cause a processor to compare a particular source identifier to a table of source identifiers to identify a corresponding global identifier mapped to the particular source identifier, and associate the corresponding global identifier with the standard data element 304.

At step 354, the data element is processed by integration logic 324. In an embodiment, the integration logic 324 receives zero or more data control policies and applies the data control policies to the data element. Again, the data control policies can permit certain information to be ingested and block other information from being ingested. The data control policies can include preferences and/or permissions set by individuals associated with the global identifier. The data control policies can also include permissions set by the owners of the data sources that permit or disallow certain uses of the published information.

In some embodiments, the integration logic 324 includes logic for generating multiple data elements from a single data element, where each data element in the multiple data elements contains a subset of information in the single data element being processed by the integration logic 324. In other embodiments, the integration logic 324 combines multiple data elements into a single data element, where information from each of the multiple data elements is included in the single data element. The multiple data elements being combined can be ingested from one data source or multiple data sources. In some embodiments, multiple data elements can only be combined when they are associated with the same global identifier.

At step 356, validation data is recorded. In an embodiment, a log or other database is updated to indicate whether a data element was ingested into the unified data fabric 102. The record for the data element can include information such as, but not limited to, a date and time of the attempt to ingest the data element, whether the ingestion process resulted in at least one valid processed data element 306 being stored in a data store 130, a location of each processed data element 306 stored in a data store 130, an identifier for each processed data element 306, and the like. In some embodiments, the records included in the validation data can be checked to see whether a particular data element 302 has previously been ingested into the unified data fabric 102 prior to processing the data element 302 by the ingestion interface.

Figure 3C:
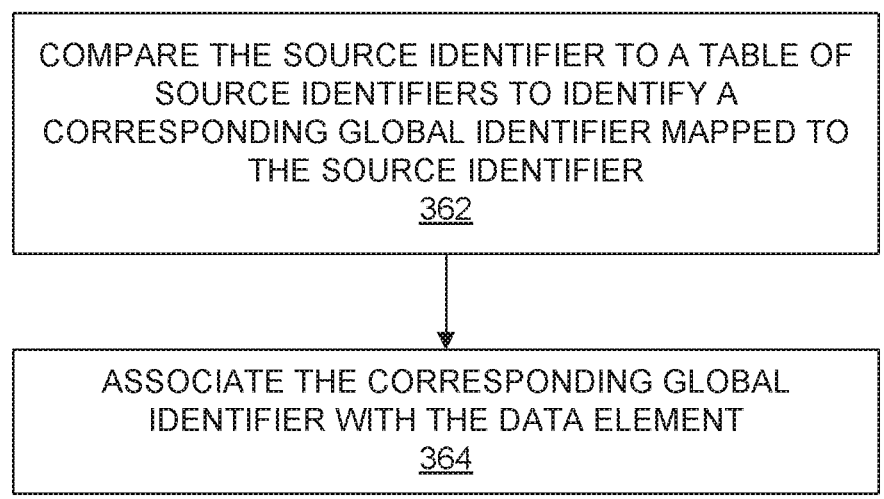
FIG. 3C is a flow diagram of a method for processing a data element through conformance logic, in accordance with some embodiments.

FIG. 3C is a flow diagram of a method for processing a data element through conformance logic 322, in accordance with some embodiments. The method can be performed as part of step 352 of method 350.

At step 362, the conformance logic 322 compares a source identifier to a table of source identifiers to identify a corresponding global identifier mapped to the source identifier. In an embodiment, the conformance logic 322 transmits a request to a global identity and permissions database 300. The request includes a source identifier from the standard data element 304. The global identity and permissions database 300 returns a global identifier that is mapped to the source identifier in a table of the database. In another embodiment, the data ingestion engine 120 includes a table associating source identifiers to the global identifiers maintained in the records of the global identity and permissions database 300. The table can be updated when new global identifiers are added to the global identity and permissions database 300. It will be appreciated that although the global identity and permissions database 300 is described as a database, that can be queried, in other embodiments, the global identity and permissions database 300 can be implemented as a service or an application available over a network and may include tables or any other structure that enables the global identifiers to be mapped to one or more source identifiers from different data sources 110.

At step 364, the conformance logic 322 associates the corresponding global identifier with the data element. In an embodiment, the global identifier replaces the source identifier in the data element. In another embodiment, the global identifier is appended to the data element, where the source identifier remains in the data element with the global identifier. In yet another embodiment, the global identifier is associated with the data element as metadata or as a key to the data element in a key-value data store such that the global identifier is not explicitly included in the data element data structure.

Figure 4:
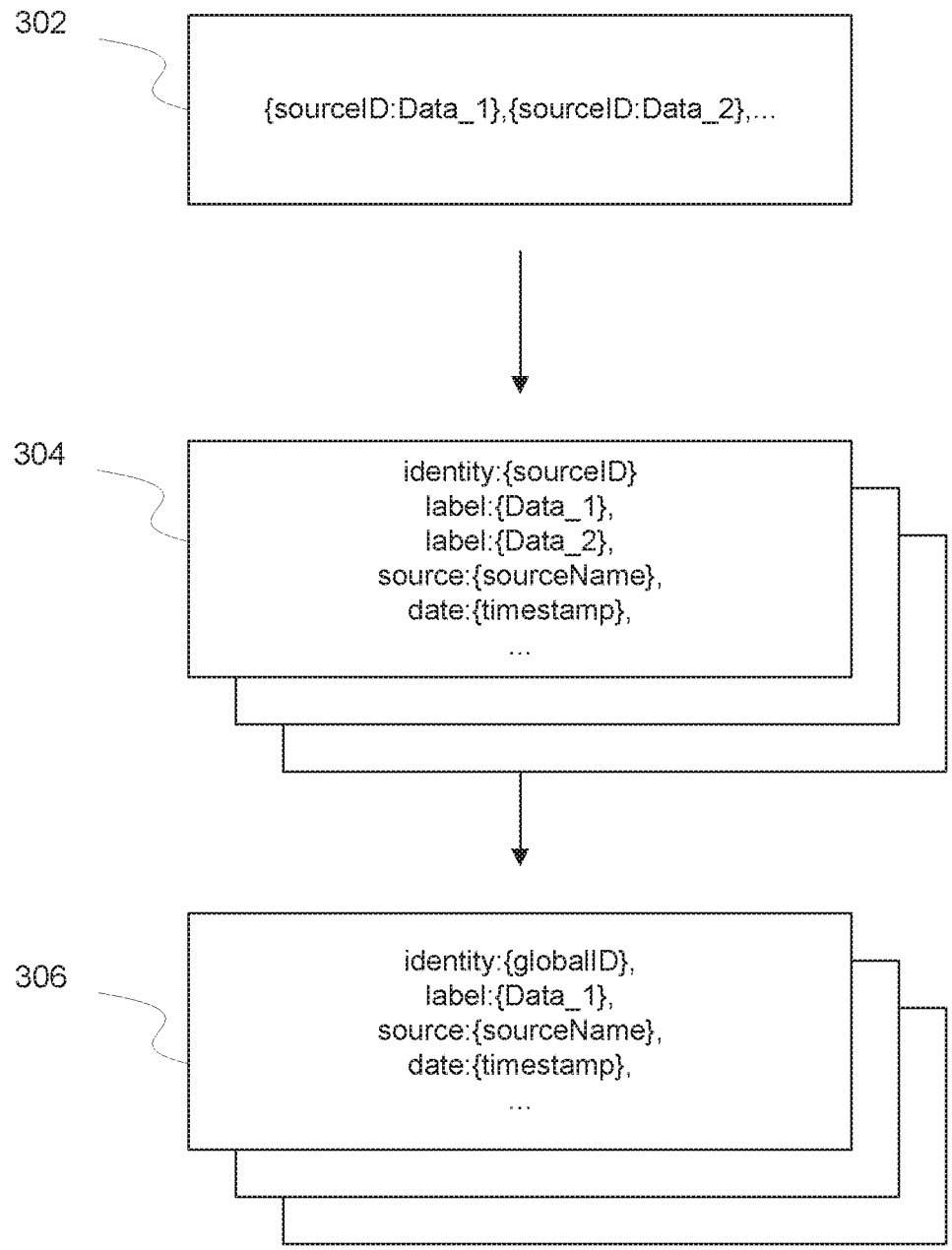
FIG. 4 illustrates a flow of a data element through the ingestion process, in accordance with some embodiments.

FIG. 4 illustrates a flow of a data element through the ingestion process, in accordance with some embodiments. A data element 302 is published by a data source 110. As depicted in FIG. 4, the data element 302 can include information (e.g., Data_1, Data_2, etc.) and source identifiers (e.g., sourceID, etc.).

The data element 302 can be in a variety of formats. As one example, each item of information can be paired with a source identifier that associates that piece of information with an account or individual corresponding to the source identifier. The data element 302 can be formatted as key-value pairs, where the keys are source identifiers. As another example, the data element 302 can be formatted as a markup language document (e.g., HTML, XML, etc.). As yet another example, the data element 302 can be formatted as a file having a particular file format (e.g., a portable document format (pdf) or a spreadsheet). It will be appreciated that the data elements 302 can be received in a variety of formats and that the ingestion interface can be configured to read and parse said format to extract the information and source identifiers.

The ingestion interface processes the data element 302 to generate the standard data element 304. The standard data element 304 can take a specific format expected by the data ingestion engine 120. In an embodiment, the standard data element 304 is given a unique identifier that can be used to identify the standard data element in a data store 130. In an embodiment, the standard data element 304 contains information for a single source identifier associated with the data source 110. If the data element 302 includes more than one source identifier, then the ingestion interface can generate multiple standard data elements 304, at least one standard data element for each unique source identifier included in the data element 302.

In an embodiment, the ingestion interface can also associate items of information with labels that can be used as keys to retrieve the items of information in the standard data element 304. For example, a first item of information (e.g., Data_1) can be a first name of an individual and associated with the label firstName, and a second item of information (e.g., Data_2) can be a last name of the individual and associated with the label lastName.

In an embodiment, the ingestion interface can also append metadata related to the data element 302 into the standard data element 304. For example, as depicted in FIG. 4, a name or identifier of the data source 110 that published the data element 302 can be included in the standard data element 304 with the label source. As another example, a timestamp that identifies a time and/or date that the data element was published or ingested into the unified data fabric 102 can be included in the standard data element 304 with the label date. It will be appreciated that the type of metadata appended to the information in the standard data element 304 described herein is not exclusive and that other types of metadata such as a size of the data element 302, a location of the data element 302 (e.g., a URL that identifies a network resource for the data element 302), a filename, a format type, or other metadata can be included in the standard data element 304 as well.

The standard data element 304 is then processed by the ingestion module 320 and generates one or more processed data elements 306. In an embodiment, the source identifier is replaced with a global identifier. The information in the processed data element 306 can include a subset of the information in the standard data element 304 based on, e.g., the data control policies as well as other conformance logic 322 or integration logic 324 included in the ingestion module 320.

In some embodiments, a single standard data element 304 can result in one or more processed data elements 306 being generated by the ingestion module 320. In some embodiments, multiple standard data elements 304 can be processed and combined into an processed data element 306.

It will be appreciated that the example shown in FIG. 4 is merely one potential flow of a data element 302 having a particular format and that other formats or flows are contemplated as being within the scope of various embodiments of the present disclosure.

Figure 5:
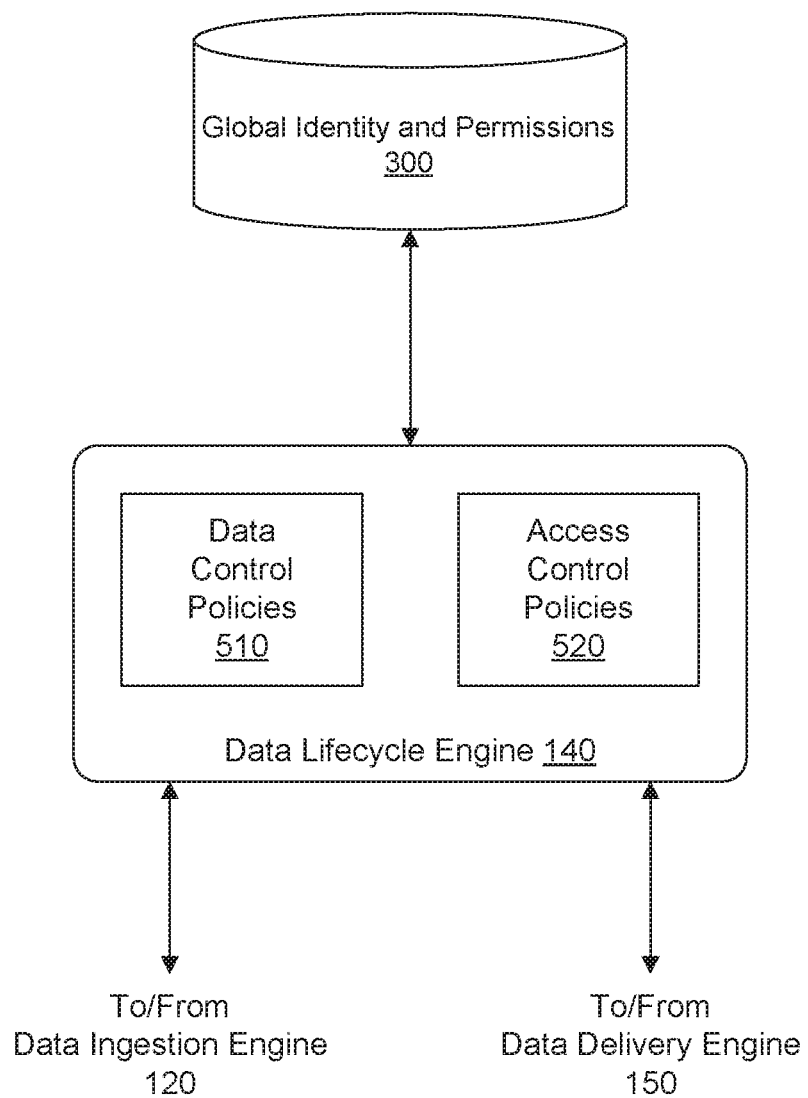
FIG. 5 illustrates a flow for management of data lifecycles, in accordance with some embodiments.

FIG. 5 illustrates a flow for management of data lifecycles, in accordance with some embodiments. As depicted in FIG. 5, the data lifecycle engine 140 manages data control policies 510 and access control policies 520 associated with data lifecycles. In an embodiment, data control policies 510 are utilized during the data ingestion process to control whether certain information is added to the unified data fabric 102. Such policies can prevent certain data (e.g., sensitive financial information, social security numbers, regulated information (e.g., health information subject to HIPAA), and the like) from being ingested into the unified data fabric 102. The data control policies 510 can also reflect legal agreements between the organization maintaining the unified data fabric 102 and any third-party organizations that own one or more data sources 110. The data control policies 510 can reflect agreements on use of certain data reflected in contractual obligations between the parties. These contractual obligations can permit copying and use of certain information contained in a data source 110 while disallowing copying or use of other information in the data source 110. For example, the data control policies can reflect agreements memorialized in a terms of use (ToU) or terms of service (ToS) agreement associated with a data source 110. In an embodiment, at least one data control policy 510 is configured to specify a data type permitted from a particular trusted data source 110.

In an embodiment, access control policies 520 are utilized during the data access process. Such policies can enable an organization to place restrictions on the type of information that can be accessed by various client devices 180. These restrictions can be based on policies developed by the organization on how the organization handles certain information, or the restrictions can be based on regulatory or compliance schemes encoded in law, regulations, or enforced by administrative agencies at the state or federal level. The access control policies 520 can also reflect preferences of users in how they have indicated they want their personal information to be handled. The access control policies 520 can also allow restrictions to be placed on the client devices 180 that permit or disallow certain client devices 180 or groups of client device 180 from accessing certain types of information.

In an embodiment, at least one access control policy 520 is configured to specify a consent preference for a constituent associated with a particular global identifier. The constituent can be an individual associated with demographic data or an entity that includes a group of individuals. The constituent can set a preference that indicates, for a particular subset of information (limited consent) or for all information (global consent), whether that constituent grants consent to access or use the information associated with the constituent (e.g., associated with the global identifier for the constituent). It will be appreciated that this allows for an organization with a relationship with a constituent in a specific context to control access to information about the individual collected from a completely separate system outside the specific context based on the preferences of the individual collected within the specific context. For example, an individual can specify, as part of their user preferences for a user account related to a health portal application, that the user expects their personal information to be kept private and opts-out of sharing that information with other partners of the service provider for the health portal application. The unified data fabric 102 can then use this preference to create an access control policy 520 that restricts use of information related to that individual from being shared with external partners through the unified data fabric 102, even if that information was collected from a source outside of the context of the health portal application. This type of policy can lead to better assurance provided to customers that their information is more secure when working with organization that enact such policies, even if the policy is more restrictive than required by statutory, regulatory, or contractual obligations.

In an embodiment, a set of access control policies 520 managed by the data lifecycle engine 140 can include at least one of a privacy policy, a compliance policy, a permissions policy, or a group policy. A privacy policy can refer to a policy related to how sensitive information is shared. For example, a privacy policy can limit personally identifying information to be accessed by client devices 180 identified as internal client devices. External client devices, such as those owned by affiliates or third-party end users may be restricted from accessing any personally identifiable information that ties an individual's name, address, or other identifying information to data related to that individual. However, internal client devices may be permitted to access such information by the privacy policy.

A compliance policy can refer to a policy related to regulatory or legal requirements. For example, a compliance policy related to HIPAA may enforce rules related to the protection of health information tied to a specific individual. Compliance policies can be related to regulations rather than specific legal statutory requirements. Compliance policies can also incorporate specific allowed uses of data that are not tied to legal or regulatory frameworks enforced externally, but instead are tied to internal frameworks regarding the specific allowed uses of certain information. For example, a compliance policy may only permit access to billing information if an invoice number is provided that matches the customer for the global identifier associated with the billing information. By controlling access to the information based on the invoice number, only individuals with knowledge of the invoice number will be permitted to access the billing information for that invoice.

A permissions policy can refer to a policy related to permissions or preferences provided by an individual. When a user sets up a user account with a service, the account can be associated with various preferences or permissions. However, the user account, if properly vetted, may also be associated with an individual that is assigned a global identifier that recognizes that individual as a unique person or entity within the context of the unified data fabric 102. Such users can typically submit preferences through the user account for how they would like their data to be handled. These preferences can be associated with a global identifier in one or more tables in the global identity and permissions database 300 and used outside of the context of the user account.

In some embodiments, the data lifecycle engine 140 can be configured to query the global identity and permission database 300 to retrieve preferences or permissions associated with a global identity and create, within the access control policies 520, one or more access control policies related to those global identities that reflect the selections made by that individual or entity in relation to their user account.

A group policy can refer to a policy that permits or denies access to information for a group of client devices 180. The group policy can apply to sets of client devices 180 specified by client identifiers, specified by network locations or by subnet masks within a particular local area network (LAN), or specified by characteristics of the members in the group (e.g., all client devices that establish a connection through a specific mobile application). Group policies can enable administrators to restrict access to information to specific clients by listing clients individually or defining a group identifier for the group and associating client devices 180 with the group identifier is a separate table.

In some embodiments, the access control policies 520 can be associated with different levels of access (LoA). LoA refers to different tiers of access, where higher LoA refers to the ability to access more sensitive information. For example, client devices associated with an accounting department might be issued a higher LoA to access secure financial records for customers stored in the unified data fabric 102, but client devices associated with a marketing department, even within the same organization that maintains the unified data fabric 102, may have a lower LoA that only permits access to less sensitive consolidated financial information for all customers. The lowest LoA can be reserved for client devices 180 connected from an external network, where a user account has not been vetted. Accounts that have been vetted to confirm that the account is tied to a specific individual may be granted a higher LoA that permits more access to certain information in the unified data fabric 102. Client devices 180 associated with employees connected to an internal network may be granted a higher LoA, and so forth. Access control policies 520 can be associated with LoAs to help enforce security measures related to the access of the information in the unified data fabric 102.

As depicted in FIG. 5, the data ingestion engine 120 can request data control policies from the data lifecycle engine 140. The request can include a global identifier associated with a standard data element 304, an identifier for the data source 110, a type of information included in the standard data element 304, or any other information required to select or query the applicable data control policies 510 from the set of data control policies 510 maintained by the data lifecycle engine 140. Similarly, the data delivery engine 150 can request access control policies 520 from the data lifecycle engine 140. The request can include a client device identifier, group identifier, application identifier, global identifier, an identifier for the data element being accessed, a type of information being accessed, or any other information required to select or query the applicable access control policies 520 from the set of access control policies 520 maintained by the data lifecycle engine 140.

Figure 6A:
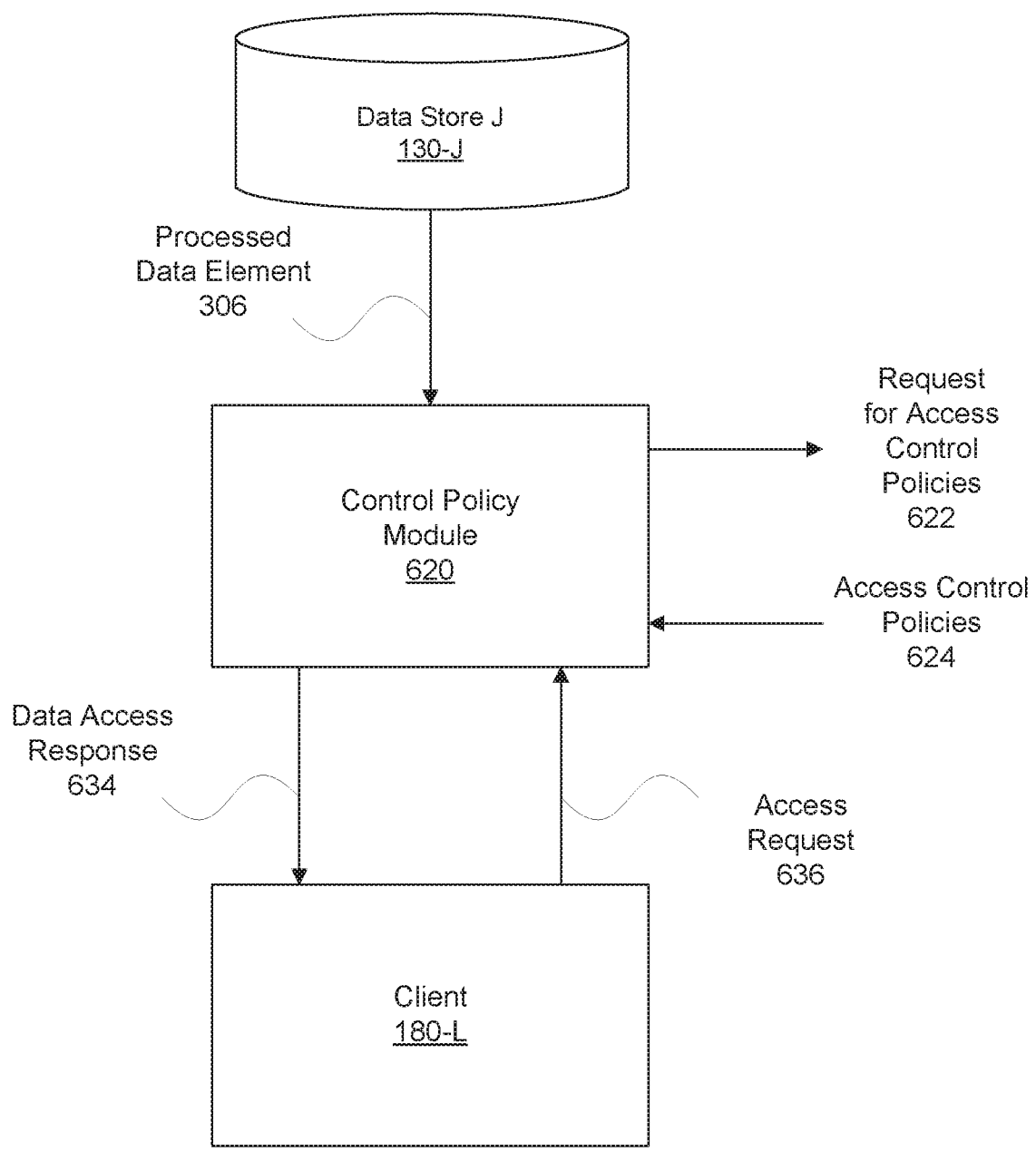
FIG. 6A illustrates a flow for accessing data elements stored in the unified data fabric, in accordance with some embodiments.

FIG. 6A illustrates a flow for accessing data elements stored in the unified data fabric 102, in accordance with some embodiments. As depicted in FIG. 6A, the data delivery engine 150 includes a control policy module 620. As used herein, the control policy module 620 can include hardware or software, executed by one or more processors, that includes logic for controlling access to the processed data elements 306 stored in the unified data fabric 102.

A flow of processed data elements 306 to a client device 180 can be described as follows. A client device 180-L transmits a request 636 to access a processed data element 306 to the unified data fabric 102. The request 636 can be generated by an application or a browser executed by the client device 180-L. The request 636 is received by the control policy module 620, which transmits a related request 622 for any applicable access control policies 520 to the data lifecycle engine 140. In an embodiment, the request 636 can include an identifier of an processed data element 306 for which access is requested. In another embodiment, the request 636 can include parameters that are used by the data delivery engine 150 to query a data store 130-J to identify the processed data element 306 being requested.

For example, the request 636 can include a search query that, e.g., specifies a particular type of information related to a person having a specific name and/or associated with a particular address using known values for the name and address of the person. The data delivery engine 150 can query a data store 130-J to identify one or more processed data elements 306. Once the data delivery engine 150 receives the one or more processed data elements 306 based on the query, the control policy module 620 reads the global identity from the returned processed data element 306 and generates the request 622 for the set of applicable access control policies 520. The data lifecycle engine 140 returns a response 624 that includes or provides a reference to the set of applicable access control policies 520. The control policy module 620 can then apply the set of applicable access control policies 520 to determine whether the client 180-L has permission to access the processed data element 306.

In an embodiment, when the client 180-L is not permitted to access the information included in the processed data element 306, then the response either does not include the data element or indicates, through a message to the client 180-L, that the access is denied, depending on the data access policy. In some embodiments, no response is transmitted when access is denied, and the client 180-L may infer access is denied through a timeout mechanism or after a failed number of retry attempts. However, when the client 180-L is permitted to access the information included in the processed data element 306, then the response can include the information in the processed data element 306. In an embodiment, the response 634 includes the processed data element 306 directly. In another embodiment, the response 634 includes the information from the processed data element 306 by providing a view of the information in a different form or format.

In some embodiments, the response 634 provides a view of information from multiple processed data elements 306 related to the request 636. For example, where the query returns two or more processed data elements 306 from the data store(s) 130, then the response 634 can provide a view that includes the information from at least two different processed data elements 306 retrieved from one or more data stores 130. Such embodiments allow for the data delivery engine 150 to provide a comprehensive view of information stored in disparate data stores 130 in the unified data fabric 102 in a simple and easy to view interface on the client device 180.

In an embodiment, the data delivery engine 150 is configured to receive a first data element from a first data store and receive a second data element from the first data store or a second data store. The first data element and the second data element are associated with a first global identifier. The data delivery engine 150 is configured to generate an integrated view of multiple data elements that includes first information from the first data element and second information from the second data element and transmit the integrated view to a client. It will be appreciated that, when combined with the functionality of the data ingestion engine 120, discussed above, information for related data elements can either be combined during the data ingestion process to generate integrated data elements in the data stores or the information can be kept separate in different data elements in the data stores and combined during the data delivery process to provide a comprehensive view of information from multiple data elements.

Figure 6B:
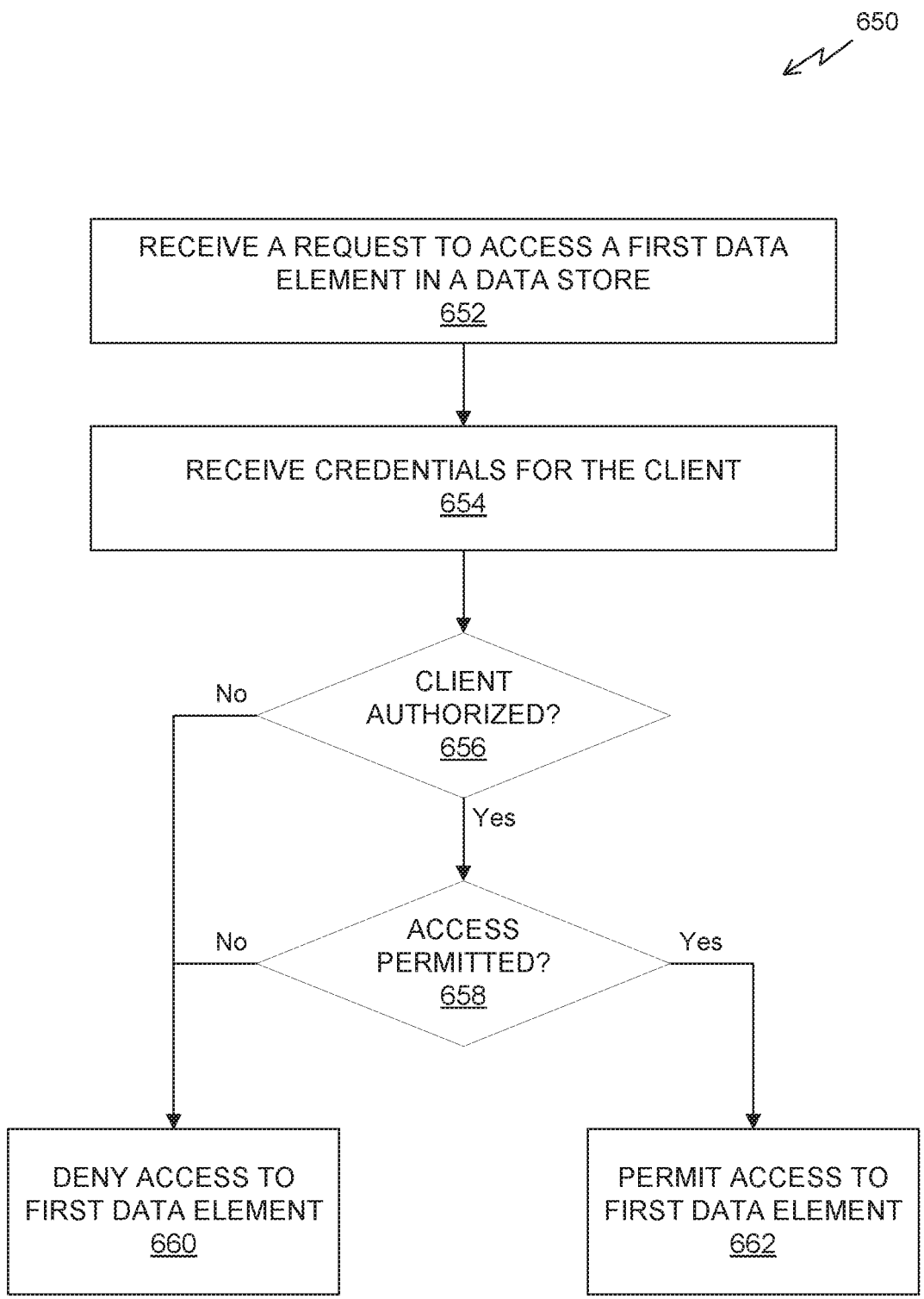
FIG. 6B is a flow diagram of a method for controlling access to data elements in the unified data fabric, in accordance with some embodiments.

FIG. 6B is a flow diagram of a method 650 for controlling access to data elements in the unified data fabric 102, in accordance with some embodiments. The method 650 can be performed by a program, custom circuitry, or by a combination of custom circuitry and a program. For example, the method 650 can be performed by one or more processors configured to execute instructions that cause the processor(s) to carry out the steps of the method 650. Furthermore, persons of ordinary skill in the art will understand that any system that performs method 650 is within the scope and spirit of the embodiments described herein.

At step 652, a request 636 is received from a client to access a first data element in a data store 130. In some embodiments, the request 636 can identify the first data element directly. In other embodiments, the request 636 can include parameters, such as a search query, that enable the data delivery engine 150 to select the first data element from the data store 130.

At step 654, credentials are received from the client. In some embodiments, the client device 180 can provide credentials, such as an authentication token, to the data delivery engine 150 along with the request 636 that authorizes the client device 180 to establish a connection with the data delivery engine 150. In other embodiments, a user of the client device 180 can provide credentials, such as username/password associated with a user account, which are transmitted to the data delivery engine 150 to authenticate the client device 180.

At step 656, the data delivery engine 150 determines whether the client is authorized to access information in the unified data fabric 102. The determination can be made based on the credentials, such as verifying the authentication token or verifying that the username/password is valid. If the client device 180 is not authorized to establish a connection with the data delivery engine 150, such as if the token is expired or the username/password does not match stored credentials for the user account, then the method 650 proceeds to step 660, where the data delivery engine 150 either does not transmit the data element to the client 180 or sends a message to the client device 180 that indicates access is denied, depending on the data access policy. However, at step 656, if the client device 180 is authorized to establish a connection with the data delivery engine 150, then the method 650 proceeds to step 658, where the data delivery engine 150 determines whether the client device 180 is permitted to access the first data element based on a set of access control policies 520 associated with the first data element.

If the client device 180 is not permitted to access the first data element, then, at step 660, the data delivery engine 150 either does not transmit the data element to the client 180 or sends a message to the client device 180 that indicates access is denied, depending on the data access policy. However, returning to step 658, if the client device 180 is permitted to access the first data element, then, at step 662, the data delivery engine 150 transmits the first data element to the client. Alternatively, at step 662, the data delivery engine 150 transmits a view of information included in the first data element to the client device 180.

It will be appreciated that the various elements included in the unified data fabric 102 can be implemented by one or more processes or applications configured to be executed by a computer system that includes at least one processor. In some embodiments, each element of the unified data fabric 102 can be implemented on different nodes connected by a network. Furthermore, each element of the unified data fabric 102 can be implemented on multiple nodes to spread the load using various load balancing techniques. For example, the data ingestion engine 120 can be deployed on one or more network nodes in one data center and the data delivery engine 150 can be deployed on one or more additional network nodes in the same or a different data center. In some embodiments, each data store 130 can be implemented in one or more network nodes that include storage resources. Each network node can be configured to transfer data to the other network nodes via one or more communication protocols. In other embodiments, the various elements of the unified data fabric 102 can be implemented on the same network node.

Figure 7:
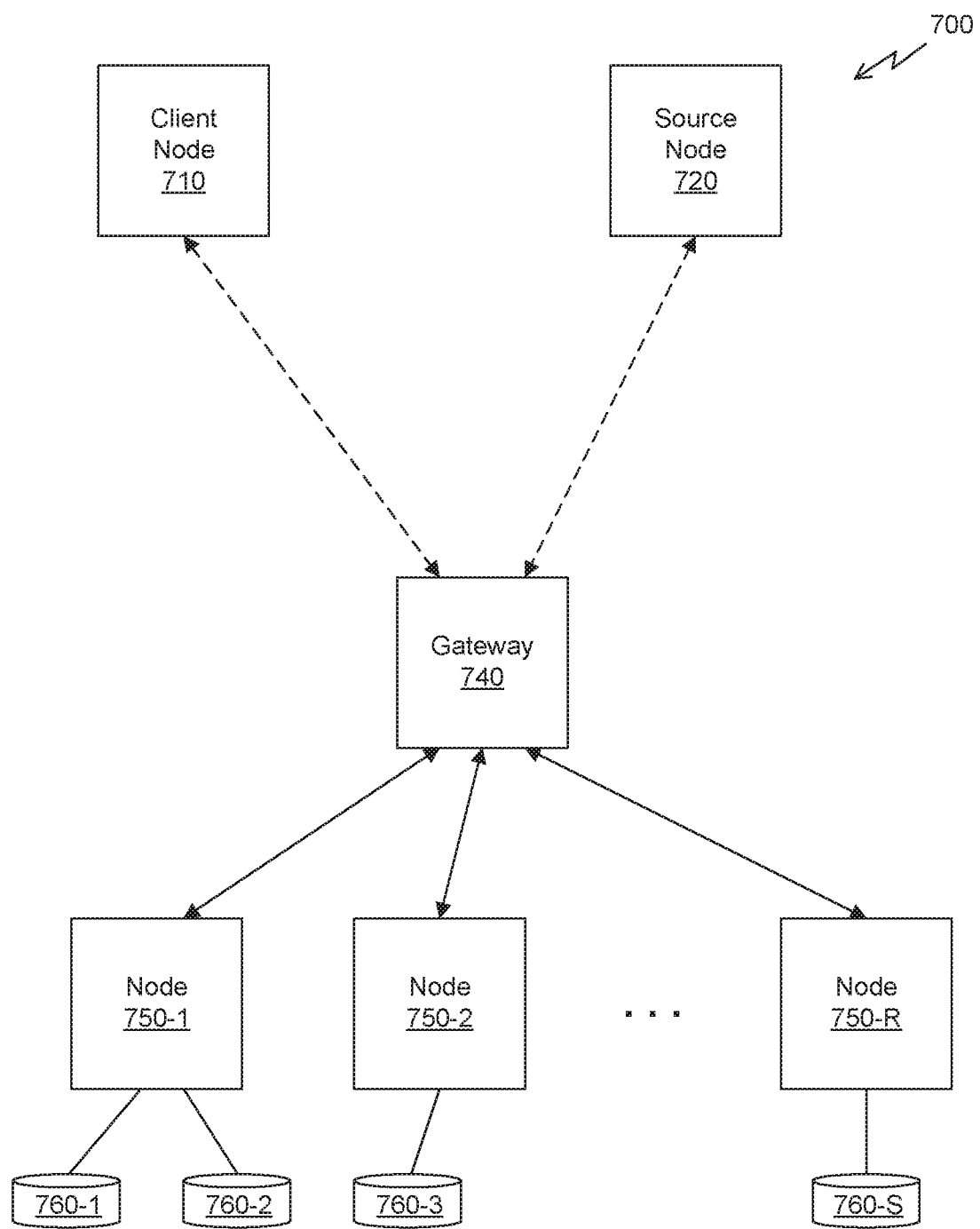
FIG. 7 illustrates a network topology for implementing the unified data fabric, in accordance with some embodiments.

FIG. 7 illustrates a network topology 700 for implementing the unified data fabric, in accordance with some embodiments. A gateway 740 can be connected to a plurality of network nodes 750, including R network node 750-1, 750-2, . . . 750-R. A client node 710 and a source node 720 are connected, through a network, to the gateway 740. The client node 710 is one of the client devices 180 and the source node 720 is a server that acts as one of the data sources 110.

In an embodiment, the data ingestion engine 120, the data lifecycle engine 140, and the data delivery engine 150 are implemented in the gateway 740, and each data store 130 is implemented on one or more network nodes 750, which include storage resources 760-1, 760-2, 760-3, . . . 760-S. In another embodiment, each of the data ingestion engine 120, the data lifecycle engine 140, and the data delivery engine 150 are implemented in a different gateway 740, where the network topology 700 includes multiple instances of the gateway 740. In yet other embodiments, the gateway 740 is a frontend for load-balancing and each of the data ingestion engine 120, the data lifecycle engine 140, and the data delivery engine 150 are implemented by one or more network nodes 750.

As shown in FIG. 7, the dashed lines between nodes represent external connections established through a wide area network (WAN) such as the Internet and the solid lines between nodes represent internal connections established through a local area network (LAN). In some embodiments, the gateway 740 includes a firewall or other security systems for preventing unauthorized access to the data stored on the storage resources 760. Although not explicitly shown, the nodes 750 can each communicate directly or indirectly with the other nodes 750 in the LAN.

Figure 8:
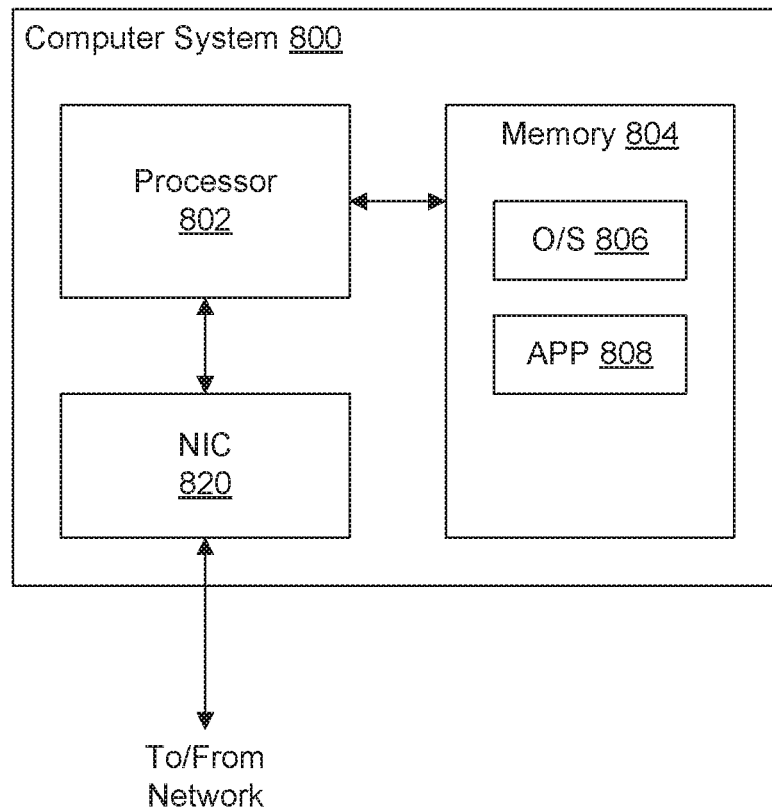
FIG. 8 illustrates an exemplary computer system, in accordance with some embodiments.

FIG. 8 illustrates an exemplary computer system 800, in accordance with some embodiments. The computer system 800 includes a processor 802, a non-volatile memory 804, and a network interface controller (NIC) 820. The processor 802 can execute instructions that cause the computer system 800 to implement the functionality various elements of the unified data fabric described above.

Each of the components 802, 804, and 820 can be interconnected, for example, using a system bus to enable communications between the components. The processor 802 is capable of processing instructions for execution within the system 800. The processor 802 can be a single-threaded processor, a multi-threaded processor, a vector processor or parallel processor that implements a single-instruction, multiple data (SIMD) architecture, or the like. The processor 802 is capable of processing instructions stored in the volatile memory 804. In some embodiments, the volatile memory 804 is a dynamic random access memory (DRAM). The instructions can be loaded into the volatile memory 804 from a non-volatile storage, such as a Hard Disk Drive (HDD) or a solid state drive (not explicitly shown), or received via the network. In an embodiment, the volatile memory 804 can include instructions for an operating system 806 as well as one or more applications 808. It will be appreciated that the application(s) 808 can be configured to provide the functionality of one or more components of the unified data fabric 102, as described above. The NIC 820 enables the computer system 800 to communicate with other devices over a network, including a local area network (LAN) or a wide area network (WAN) such as the Internet.

It will be appreciated that the computer system 800 is merely one exemplary computer architecture and that the processing devices implemented in the unified data fabric 102 can include various modifications such as additional components in lieu of or in addition to the components shown in FIG. 8. For example, in some embodiments, the computer system 800 can be implemented as a system-on-chip (SoC) that includes a primary integrated circuit die containing one or more CPU cores, one or more GPU cores, a memory management unit, analog domain logic and the like coupled to a volatile memory such as one or more SDRAM integrated circuit dies stacked on top of the primary integrated circuit dies and connected via wire bonds, micro ball arrays, and the like in a single package (e.g., chip). In another embodiment, the computer system 800 can be implemented as a server device, which can, in some embodiments, execute a hypervisor and one or more virtual machines that share the hardware resources of the server device.

Furthermore, in some embodiments, each of the network nodes depicted in FIG. 7 can be implemented as a different instance of the computer system 800. Alternatively, each of the network nodes depicted in FIG. 7 can be implemented as a virtual machine on one or more computer systems 800. Various computer system and network architectures for implementing the elements of the unified data fabric 102 are contemplated as being within the scope of the embodiments described herein and the various embodiments are not limited to the network topology 700 or the computer system 800 depicted in FIGS. 7 and 8.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the embodiments as claimed.

What is claimed is:

1. A computing device that manages data lifecycles and data flows between data sources and data clients, the computing device comprising:
one or more memories storing instructions; and
one or more processors configured to execute the instructions to cause the computing device to:
receive a notification that a first data source published a first data element, wherein the first data element includes a first source identifier that associates the first data element with a first account or individual corresponding to the first source identifier;
receive a notification that a second data source published a second data element, wherein the second data element includes a second source identifier that associates the second data element with a second account or individual corresponding to the second source identifier;
determine that the first data element is approved to be integrated with the second data element within a unified data fabric system based on one or more data control policies;

identify a global identifier mapped to the first source identifier included in the first data element and the second source identifier included in the second data element;

receive the first data element from the first data source and the second data element from the second data source;

generate an integrated data element that includes first information from the first data element and second information from the second data element, wherein the first data source is a trusted data source of the first information and the second data source is a trusted data source of the second information;

associate the corresponding global identifier with the integrated data element by appending the global identifier to the integrated data element;

store the integrated data element in a data store;

receive a request from a client to access the integrated data element in the data store;

determine whether the client is authorized to establish a connection with the unified data fabric system;

determine whether the client is permitted to access the integrated data element based on a set of access control policies associated with the integrated data element, wherein the set of access control policies includes at least one access control policy configured to specify a consent preference for a particular constituent associated with the global identifier, and wherein the consent preference indicates limited consent for a subset of information included in the integrated data element or global consent for all information included in the integrated data element; and in response to the client not being authorized to establish the connection or not permitted to access the integrated data element, prevent transmission of the integrated data element to the client, or in response to the client being authorized to establish the connection and permitted to access the integrated data element, transmit the integrated data element to the client, wherein each unique global identifier is associated with a different constituent of the unified data fabric system that comprises one of:

an individual associated with demographic information; or an entity associated with a group of one or more individuals.

2. The computing device of claim 1, wherein the one or more processors are further configured to execute the instructions to cause the computing device to:

identify a first ingestion interface corresponding to the first data source;

identify the one or more data control policies associated with the first data source;

identify a second ingestion interface corresponding to the second data source; and identify the one or more data control policies associated with the second data source.

3. The computing device of claim 2, wherein the one or more processors are further configured to execute the instructions to cause the computing device to:

process the first data element via conformance logic in accordance with one or more conformance rules for the first data source;

process the second data element via the conformance logic in accordance with one or more conformance rules for the second data source;

process the first data element via integration logic in accordance with permissions associated with the first data element;

process the second data element via the integration logic in accordance with permissions associated with the second data element; and record validation data that indicates whether the first data element and/or the second data element were successfully ingested into the unified data fabric system.

4. The computing device of claim 1, wherein the one or more processors are further configured to execute the instructions to cause the computing device to:

manage data control policies and access control policies associated with data lifecycles, wherein at least one data control policy is configured to specify a data type permitted from a particular data source, and wherein at least one access control policy is configured to specify a constituent type permitted to view a data type via a client.

5. The computing device of claim 1, wherein the set of access control policies includes at least one of: a privacy policy; a compliance policy; a permissions policy; or a group policy.

6. A method for managing data lifecycles and data flows between data sources and data clients, the method comprising:

receiving a notification that a first data source published a first data element, wherein the first data element includes a first source identifier that associates the first data element with a first account or individual corresponding to the first source identifier;

receiving a notification that a second data source published a second data element, wherein the second data element includes a second source identifier that associates the second data element with a second account or individual corresponding to the second source identifier;

determining that the first data element is approved to be integrated with the second data element within a unified data fabric system based on one or more data control policies;

identifying a global identifier mapped to the first source identifier included in the first data element and the second source identifier included in the second data element;

receiving the first data element from the first data source and the second data element from the second data source;

generating an integrated data element that includes first information from the first data element and second information from the second data element, wherein the first data source is a trusted data source of the first information and the second data source is a trusted data source of the second information;

associating the global identifier with the integrated data element by appending the global identifier to the integrated data element;

storing the integrated data element in a data store;

receiving a request from a client to access the integrated data element in the data store;

determining whether the client is authorized to establish a connection with the unified data fabric system;

determining whether the client is permitted to access the integrated data element based on a set of access control policies associated with the integrated data element, wherein the set of access control policies includes at least one access control policy configured to specify a consent preference for a particular constituent associated with the global identifier, and wherein the consent preference indicates limited consent for a subset of information included in the integrated data element or global consent for all information included in the integrated data element; and in response to the client not being authorized to establish the connection or not permitted to access the integrated data element, preventing transmission of the integrated data element to the client, or in response to the client being authorized to establish the connection and permitted to access the integrated data element, transmitting the integrated data element to the client, wherein each unique global identifier is associated with a different constituent of the unified data fabric system that comprises one of:

an individual associated with demographic information; or an entity associated with a group of one or more individuals.

7. The method of claim 6, wherein the first data element from the first data source is ingested via a first ingestion interface, and the second data element from the second data source is ingested via a second ingestion interface.

8. The method of claim 6, wherein the set of access control policies include at least one of:

a privacy policy;
a compliance policy;
a permissions policy; or
a group policy.

9. The method of claim 6, the method further comprising:

processing the first data element via conformance logic in accordance with one or more conformance rules for the first data source;

processing the second data element via the conformance logic in accordance with one or more conformance rules for the second data source;

processing the first data element via integration logic in accordance with permissions associated with the first data element;

processing the second data element via the integration logic in accordance with permissions associated with the second data element; and recording validation data that indicates whether the first data element and/or the second data element were successfully ingested.

10. A non-transitory computer-readable medium storing instructions that, when executed by a processor, cause the processor to ingest data elements into a unified data fabric system by performing steps comprising:

receiving a notification that a first data source published a first data element, wherein the first data element includes a first source identifier that associates the first data element with a first account or individual corresponding to the first source identifier;

receiving a notification that a second data source published a second data element, wherein the second data element includes a second source identifier that associates the second data element with a second account or individual corresponding to the second source identifier;

determining that the first data element is approved to be integrated with the second data element within a unified data fabric system based on one or more data control policies;

identifying a global identifier mapped to the first source identifier included in the first data element and the second source identifier included in the second data element;

receiving the first data element from the first data source and the second data element from the second data source;

generating an integrated data element that includes first information from the first data element and second information from the second data element, wherein the first data source is a trusted data source of the first information and the second data source is a trusted data source of the second information;

associating the global identifier with the integrated data element by appending the global identifier to the integrated data element;

storing the integrated data element in a data store;

receiving a request from a client to access the integrated data element in the data store;

determining whether the client is authorized to establish a connection with the unified data fabric system;

determining whether the client is permitted to access the integrated data element based on a set of access control policies associated with the integrated data element, wherein the set of access control policies includes at least one access control policy configured to specify a consent preference for a particular constituent associated with the global identifier, and wherein the consent preference indicates limited consent for a subset of information included in the integrated data element or global consent for all information included in the integrated data element; and in response to the client not being authorized to establish the connection or not permitted to access the integrated data element, preventing transmission of the integrated data element to the client, or in response to the client being authorized to establish the connection and permitted to access the integrated data element, transmitting the integrated data element to the client, wherein each unique global identifier is associated with a different constituent of the unified data fabric system that comprises one of:

an individual associated with demographic information; or an entity associated with a group of one or more individuals.

11. The non-transitory computer-readable medium of claim 10, wherein the set of access control policies include at least one of:

a privacy policy;
a compliance policy;
a permissions policy; or
a group policy.

* * * * *